(12) United States Patent
Malapati et al.

(10) Patent No.: US 11,247,632 B2
(45) Date of Patent: Feb. 15, 2022

(54) AIRBAG ASSEMBLY WITH RELEASABLE PANEL

(71) Applicant: Ford Global Technologies, LLC, Dearborn, MI (US)

(72) Inventors: Srinivas Reddy Malapati, Novi, MI (US); Mangesh Kadam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 142 days.

(21) Appl. No.: 16/594,120

(22) Filed: Oct. 7, 2019

(65) Prior Publication Data

US 2021/0101557 A1    Apr. 8, 2021

(51) Int. Cl.
| | |
|---|---|
| *B60R 21/16* | (2006.01) |
| *B60R 21/232* | (2011.01) |
| *B60R 21/205* | (2011.01) |
| *B60R 21/216* | (2011.01) |
| *B60R 21/215* | (2011.01) |

(52) U.S. Cl.
CPC .......... *B60R 21/232* (2013.01); *B60R 21/205* (2013.01); *B60R 21/216* (2013.01); *B60R 2021/21537* (2013.01)

(58) Field of Classification Search
CPC ... B60R 21/232; B60R 21/205; B60R 21/216; B60R 2021/21537
USPC .............................................. 280/728.3, 732
See application file for complete search history.

(56) References Cited

U.S. PATENT DOCUMENTS

| | | | | |
|---|---|---|---|---|
| 5,411,288 | A | * | 5/1995 | Steffens, Jr. .......... B60R 21/215 280/728.3 |
| 5,899,488 | A | * | 5/1999 | Muller ................ B60R 21/2155 280/728.3 |
| 6,364,345 | B1 | * | 4/2002 | Lang .................... B60R 21/2155 16/287 |
| 6,460,880 | B1 | | 10/2002 | Gallagher et al. |
| 6,616,182 | B2 | | 9/2003 | Woolley et al. |
| 6,679,519 | B2 | * | 1/2004 | Muller ................ B60R 21/2155 280/728.3 |
| 6,733,033 | B2 | * | 5/2004 | Muller .................. B60R 21/205 280/728.3 |
| 7,165,780 | B2 | * | 1/2007 | Segura ................ B60R 21/2155 280/728.3 |
| 8,177,255 | B2 | | 5/2012 | Le Hoang et al. |
| 8,181,986 | B2 | | 5/2012 | Schlemmer |
| 8,408,588 | B2 | | 4/2013 | Wittkamp |
| 8,424,905 | B2 | | 4/2013 | Brunet |
| 8,465,049 | B2 | | 6/2013 | Tsujimoto |
| 8,550,491 | B2 | * | 10/2013 | Kuroe ................... B60R 21/215 280/728.3 |

(Continued)

FOREIGN PATENT DOCUMENTS

| | | |
|---|---|---|
| DE | 19633109 A1 | 2/1997 |
| DE | 10257758 A1 | 7/2004 |

*Primary Examiner* — Toan C To
(74) *Attorney, Agent, or Firm* — Frank A. MacKenzie; Bejin Bieneman PLC

(57) ABSTRACT

An assembly for a vehicle includes interior component and a panel rotatably connected to the interior component. The assembly includes an actuator designed to rotate the panel relative to the interior component. A sheet extends from the interior component to the panel. An airbag is supported by the interior component and is inflatable to an inflated position adjacent the sheet.

20 Claims, 10 Drawing Sheets

(56) References Cited

U.S. PATENT DOCUMENTS

| | | | |
|---|---|---|---|
| 8,801,031 B1* | 8/2014 | Zucal | B60R 21/213 |
| | | | 280/730.2 |
| 9,637,081 B2 | 5/2017 | Ryan et al. | |
| 10,077,020 B2 | 9/2018 | Raikar et al. | |
| 10,457,241 B2* | 10/2019 | Weerappuli | B60R 21/205 |
| 2004/0004343 A1* | 1/2004 | Pinsenschaum | B60R 21/205 |
| | | | 280/728.3 |

* cited by examiner

AIRBAG ASSEMBLY WITH RELEASABLE PANEL

BACKGROUND

A vehicle may include one or more airbags deployable during a vehicle impact to control kinematics of occupants inside the vehicle. The airbag may be a component of an airbag assembly including a housing supporting the airbag, and an inflation device in communication with the airbag for inflating the airbag from an uninflated position to an inflated position.

DETAILED DESCRIPTION

Figure 1:
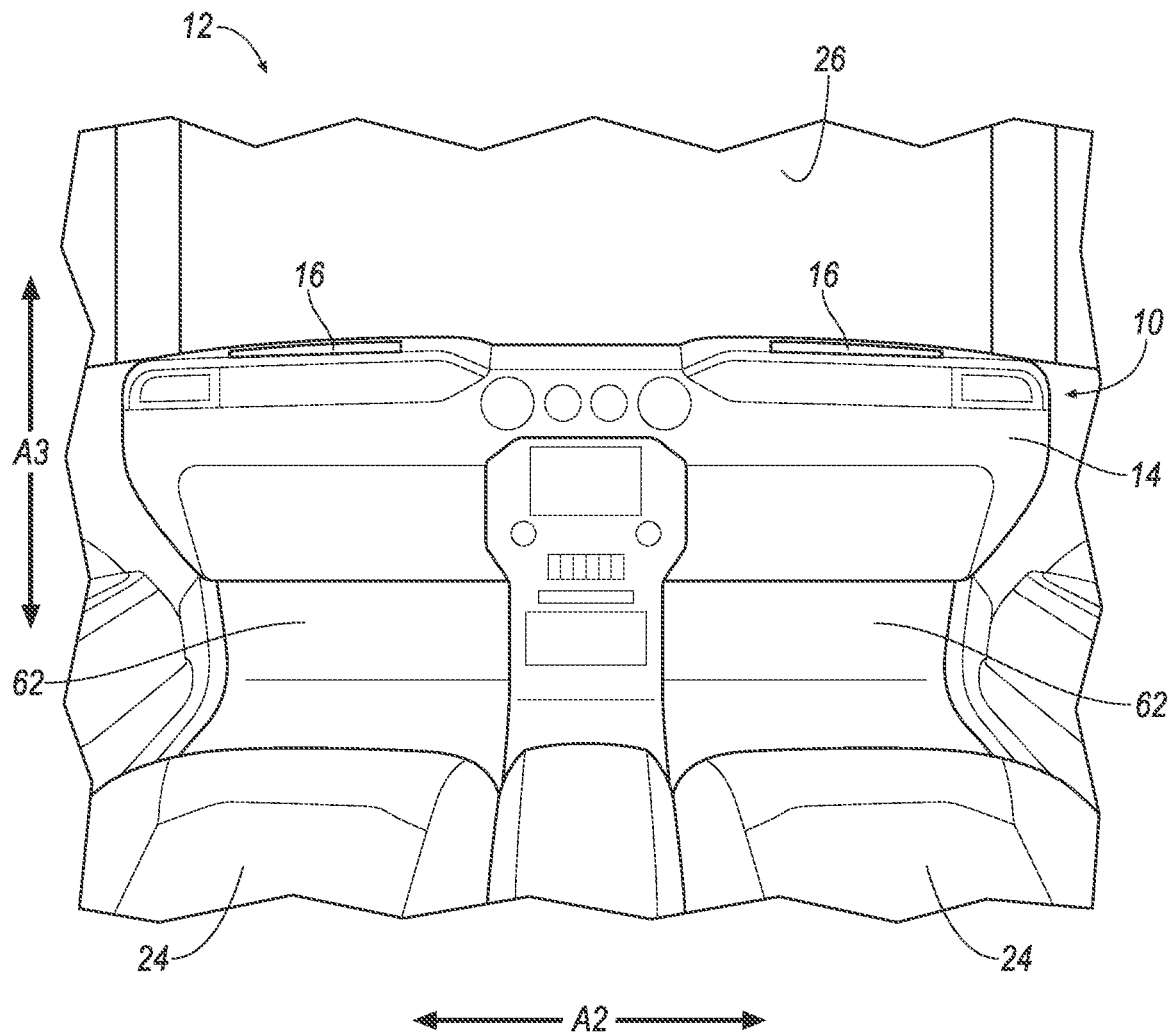
FIG. 1 is a front view of a passenger compartment of a vehicle with an assembly having two panels each in an undeployed position.

An assembly includes an interior component, a panel rotatably connected to the interior component, an actuator designed to rotate the panel relative to the interior component, a sheet extending from the interior component to the panel, and an airbag supported by the interior component and inflatable to an inflated position adjacent the sheet.

The panel may have a first end rotatably connected to the interior component and a second end spaced from the first end, the sheet extending to the second end.

The actuator may be a spring biasing the panel about the first end.

The assembly may include a tether extending from the interior component to the panel.

The assembly may include a spool supported by the interior component, the sheet being wound around the spool.

The spool may be spring-loaded.

The assembly may include a computer including a processor and a memory storing instructions executable by the processor to release the panel from the interior component and subsequently inflate the airbag.

The assembly may include a windshield, the panel being rotatable away from the interior component and toward the windshield.

The airbag may abut the sheet when the airbag is in the inflated position.

The actuator may be a spring.

The actuator may be a torsion spring.

The sheet may be flexible relative to the panel.

The interior component may include a shelf supporting the airbag and the panel overlaps the shelf.

The panel may overlap the airbag.

The sheet may be sandwiched between the panel and the shelf.

The panel may have a first end rotatably connected to the interior component and a second end spaced from the first end, the second end overlapping the shelf.

The sheet may have a first end anchored to the interior component and a second end connected to the second end of the panel.

The assembly may include a spool, the first end of the sheet being connected to the spool.

The interior component may be an instrument panel.

With reference to the Figures, wherein like numerals indicate like parts throughout the several views, an assembly 10 for a vehicle 12 includes an interior component 14 and a panel 16 rotatably connected to the interior component 14. The assembly 10 includes an actuator 18 designed to rotate the panel 16 relative to the interior component 14. A sheet 20 extends from the interior component 14 to the panel 16. An airbag 22 is supported by the interior component 14 and is inflatable to an inflated position adjacent the sheet 20.

Figure 5:
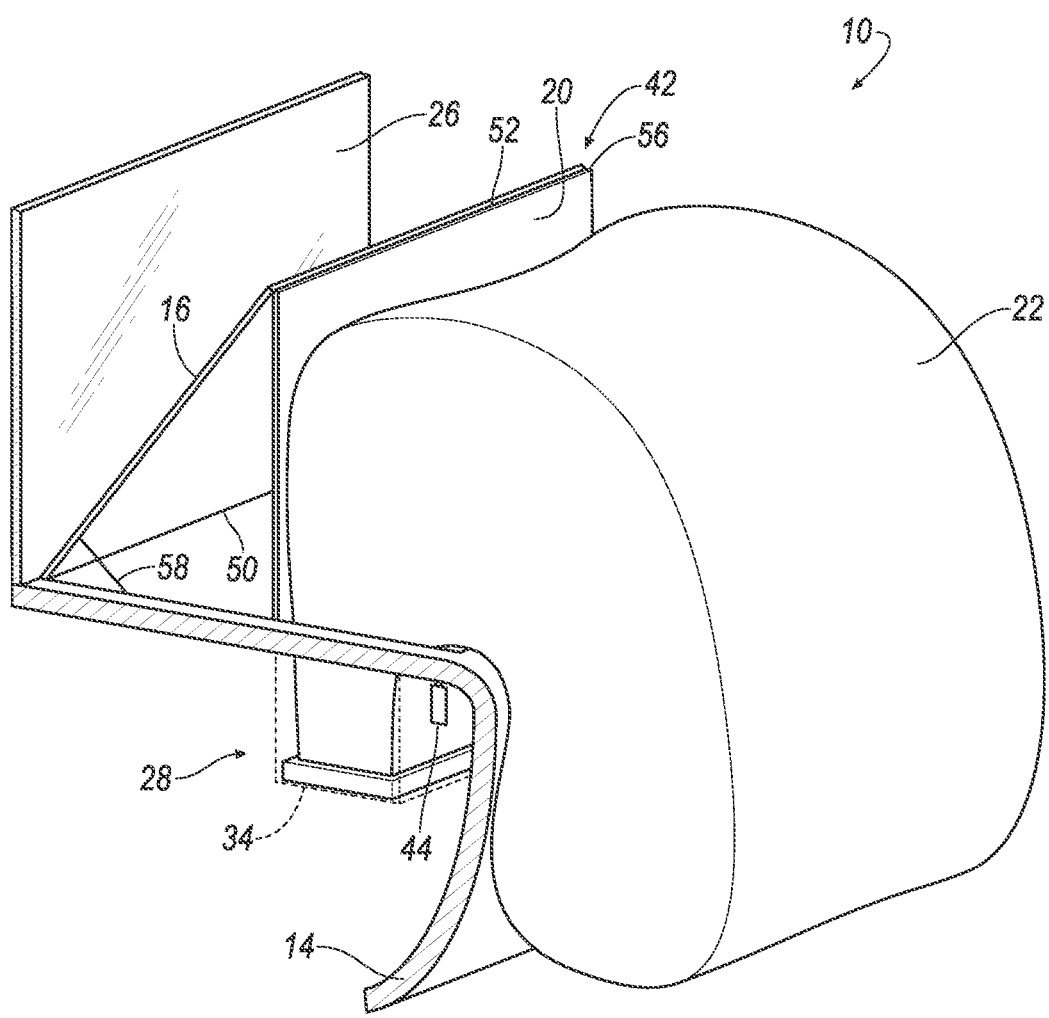
FIG. 5 is a cut-away view of a portion of the assembly with the panel in the deployed position and the airbag in the inflated position.
Figure 8:
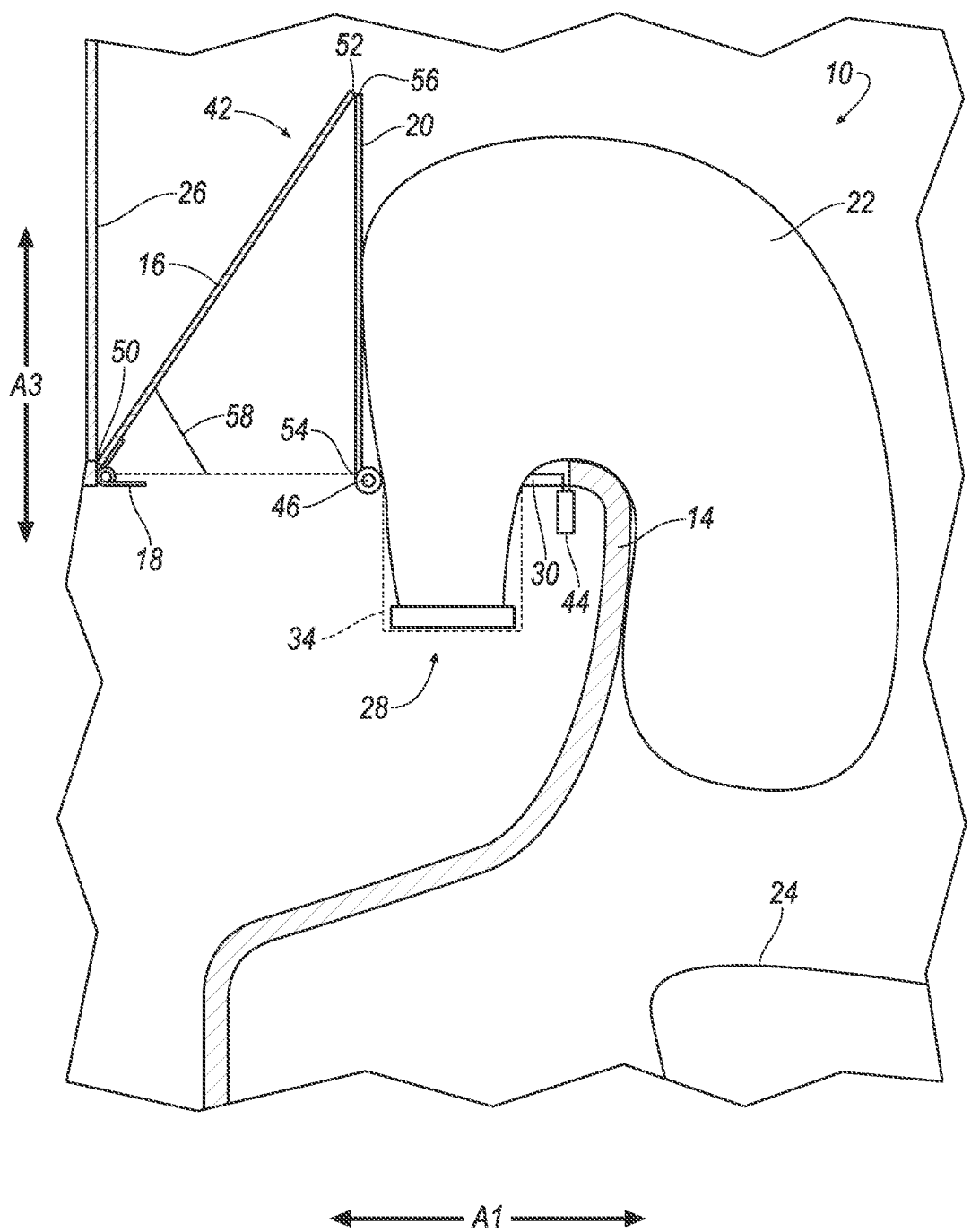
FIG. 8 is a cross-sectional view of the assembly with the panel in the deployed position and the airbag inflated.

The sheet 20 of the assembly 10 may act as a reaction surface for the airbag 22 when the airbag 22 is in the inflated position and the sheet 20 is in a deployed position, as shown in FIGS. 5 and 8. In other words, the airbag 22 in the inflated position may abut the sheet 20 under the force of inflation and/or bias by the vehicle 12 occupant toward the sheet 20. By acting as a reaction surface, the sheet 20 at least partially controls the position of the airbag 22. In some embodiments, the sheet 20 may flex when impacted by the airbag 22 to absorb energy from the airbag 22. The sheet 20 allows for the airbag 22 to be a smaller size because the sheet 20 is closer to the location of inflation relative to other reaction surfaces, e.g., a windshield 26. In such an example, this eliminates design constraints requiring the windshield 26 to the be the reaction surface, thus allowing for a greater flexibility in shape, relative spacing, etc. of the windshield 26 and the interior component 14. The vehicle 12 may be any type of passenger or commercial automobile, such as a car, a truck, a sport utility vehicle, a crossover vehicle, a van, a minivan, a taxi, a bus, etc. The vehicle 12 defines a vehicle-longitudinal axis A1, e.g., extending between a front and a rear of the vehicle 12. The vehicle 12 defines a cross-vehicle axis A2, e.g., extending between a left side and a right side of the vehicle 12. The vehicle 12 defines a vehicle-vertical axis A3, e.g., extending between a top and a bottom of the vehicle 12. The vehicle-longitudinal axis A1, the cross-vehicle axis A2, and the vehicle-vertical axis A3 are perpendicular to each other. The top, bottom, front, rear, left and right sides, and relative directions used herein (such as forward, rearward, upward, downward, etc.) relative to a driving direction of the vehicle 12 when wheels of the vehicle 12 are all parallel with each other. A vehicle-forward direction and a vehicle-rearward direction extend along the vehicle-longitudinal axis A1 and a cross-vehicle direction extends along the cross-vehicle axis A2.

Figure 2:
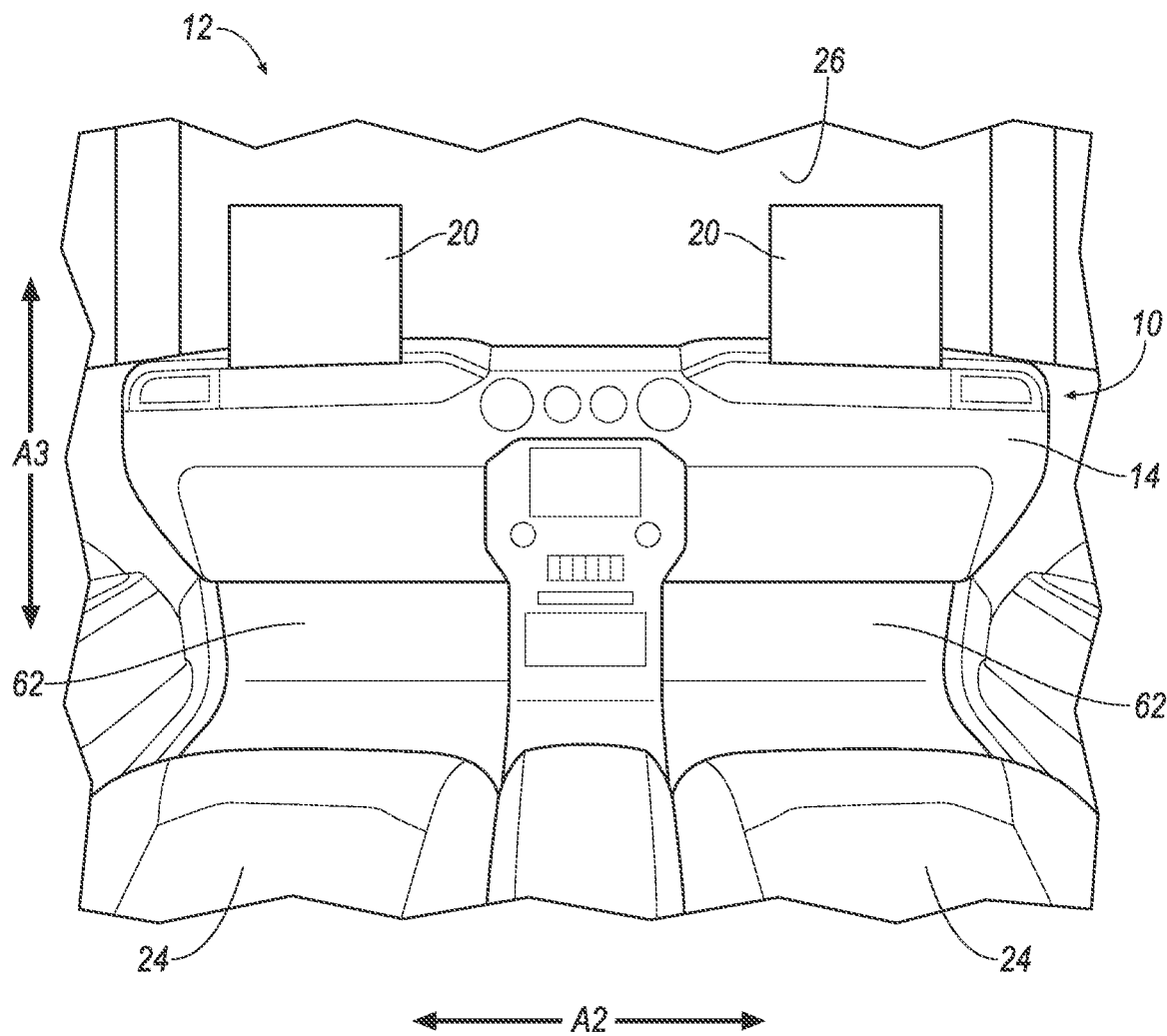
FIG. 2 is a front view of the passenger compartment with the panels in a deployed position.
Figure 3:
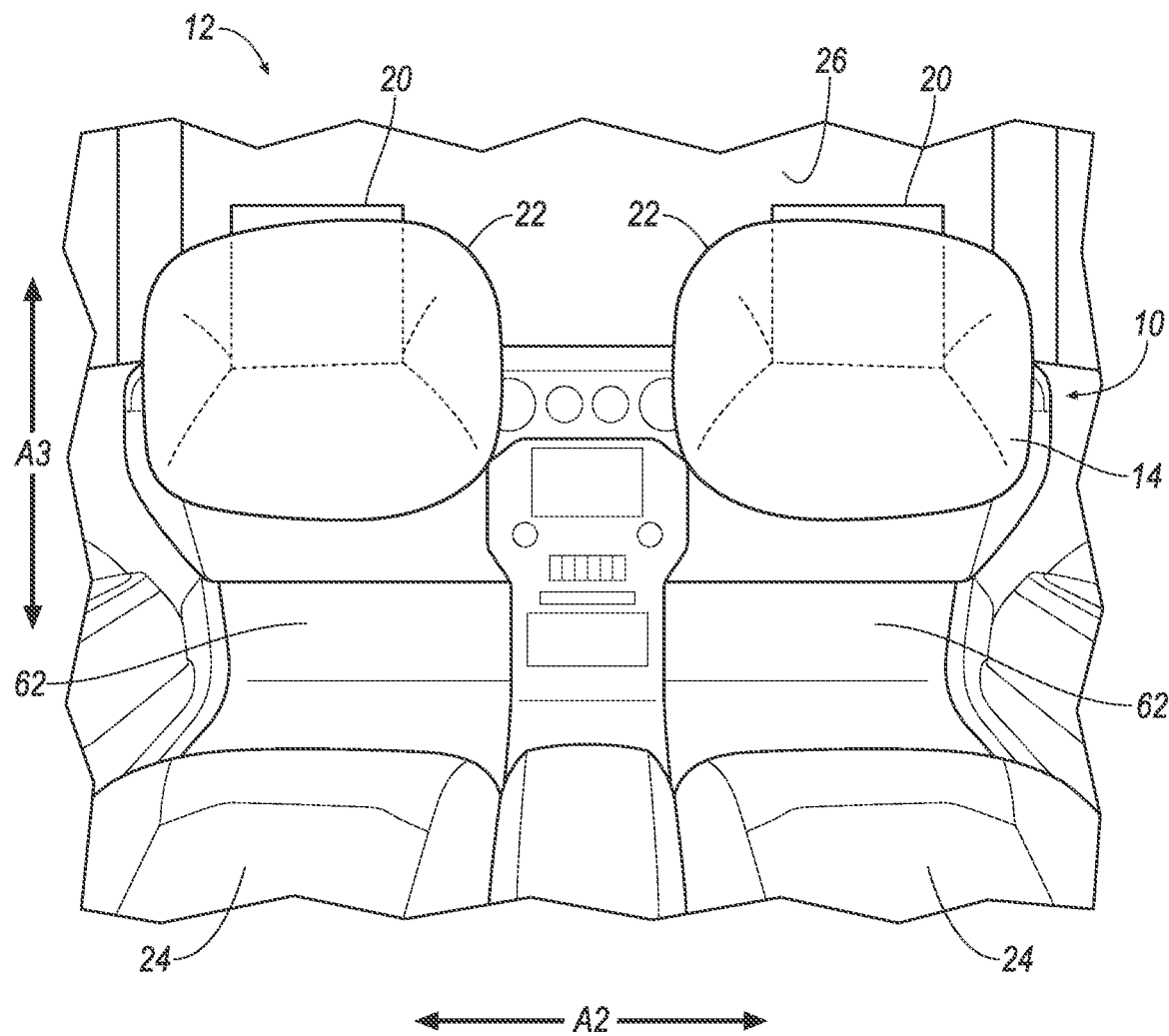
FIG. 3 is a front view of the passenger compartment with the panels in the deployed position and airbags in an inflated position.

With reference to FIGS. 1-3, the vehicle 12 includes a passenger cabin to house occupants, if any, within the vehicle 12. The passenger cabin may house the assembly 10 and one or more seats 24. In other words, the interior component 14 may be in the passenger cabin.

The vehicle 12 includes one or more seats 24. The seat 24 may be arranged in the passenger cabin in any suitable position, i.e., as front seats, rear seats, third-row seats, etc. The seat 24 may be movable relative to a floor 62 of the vehicle 12 to various positions, e.g., movable fore-and-aft and/or cross-vehicle. The seat assemblies may be of any suitable type, e.g., a bucket seat 24 as shown in FIG. 1. Each seat 24 may rotate about a generally vertical axis that extends through a roof of the vehicle 12 and the floor 62 of the vehicle 12 (i.e., generally parallel to the vehicle-vertical axis A3). For example, the seat 24 may rotate between a forward-facing position, a rearward-facing position, a rightward-facing position, a leftward-facing position, and/or positions therebetween. The seat 24 may rotate completely, i.e., 360°, about the vertical axis. The seat 24 may rotate between fixed positions, e.g., the forward-facing position and the rearward-facing position, or may be rotatable to an infinite number of positions.

The interior component 14 is positioned to be faced by the seat 24. As described below, the seats 24 may be fixed or may be rotatable about the generally vertical axis. In other words, the seats 24 may be fixed in a position facing the interior component 14 or may be rotated to a position facing the interior component 14.

The interior component 14 may be at a peripheral boundary of the passenger cabin and face inwardly toward the passenger cabin. For example, the interior component 14 may be at a front of the passenger cabin, a rear of the passenger cabin, or sides of the passenger cabin. The interior component 14 may include other components, e.g., instruments described below, on exterior panels of the interior component 14. As other examples, the exterior panels may define the only portion of the interior component 14 that faces the passenger cabin. The exterior panels may have a class-A surface, i.e., a finished surface exposed to view by a customer and free of unaesthetic blemishes and defects. The exterior panels may be a polymer (e.g., vinyl), leather, etc.

As one example, the interior component 14 may be an instrument panel, as shown in FIGS. 1-8. The instrument panel may be located at the front of the passenger cabin (as shown in FIGS. 1-3) or the rear of the passenger cabin. In such examples, the interior component 14 may be elongated in the cross-vehicle direction. The instrument panel may include one or more instruments such as vehicle controls (e.g., a steering wheel, ride-sharing controls, navigational controls, lighting controls, etc.) and/or infotainment controls (e.g., music selection controls, volume controls, map display and/or controls, etc.). The instruments may include a graphical-user interface, buttons, knobs, etc. As other examples, the interior component 14 may be a roof panel or a panel attached to or adjacent the seat 24. As another example, the interior component 14 may be a door trim panel on a door of the vehicle 12.

With continued reference to FIGS. 1-8, the windshield 26 may extend upwardly from the interior component 14. Specifically, the windshield 26 may extend from the interior component 14 to the roof. The instrument panel may be spaced from the airbag 22 in the inflated position. The windshield 26 may extend generally vertically from the instrument panel to the roof. The windshield 26 may be at the front of the passenger cabin. As another example, the windshield 26 may be at the rear of the passenger cabin. The windshield 26 is transparent. The windshield 26 may be any suitable transparent material, including glass such as laminated, tempered glass or plastic.

The assembly 10 includes an airbag assembly 28. The airbag assembly 28 is supported by the interior component 14. For example, the interior component 14 includes a shelf 30 that supports the airbag assembly 28. The airbag assembly 28 includes the airbag 22 and an inflator 32 and may include a housing 34. The airbag 22 is inflatable by the inflator 32 to the inflated position in which the airbag 22 is positioned to abut the sheet 20 when in the deployed position. The airbag assembly 28 is positioned to be a passenger airbag assembly 28. In the example shown in the Figures, the vehicle 12 may be an autonomous vehicle without a steering wheel, and in such an example, the vehicle 12 may include two assemblies, i.e., on both sides of the instrument panel in front of the seats 24 facing the interior component 14. In an example in which the vehicle 12 includes a steering wheel, the vehicle 12 may have one assembly 10 in front of a passenger seat 24, e.g., the right front seat 24. Alternatively, the vehicle 12 may have any suitable number of assemblies in any suitable position.

Figure 6:
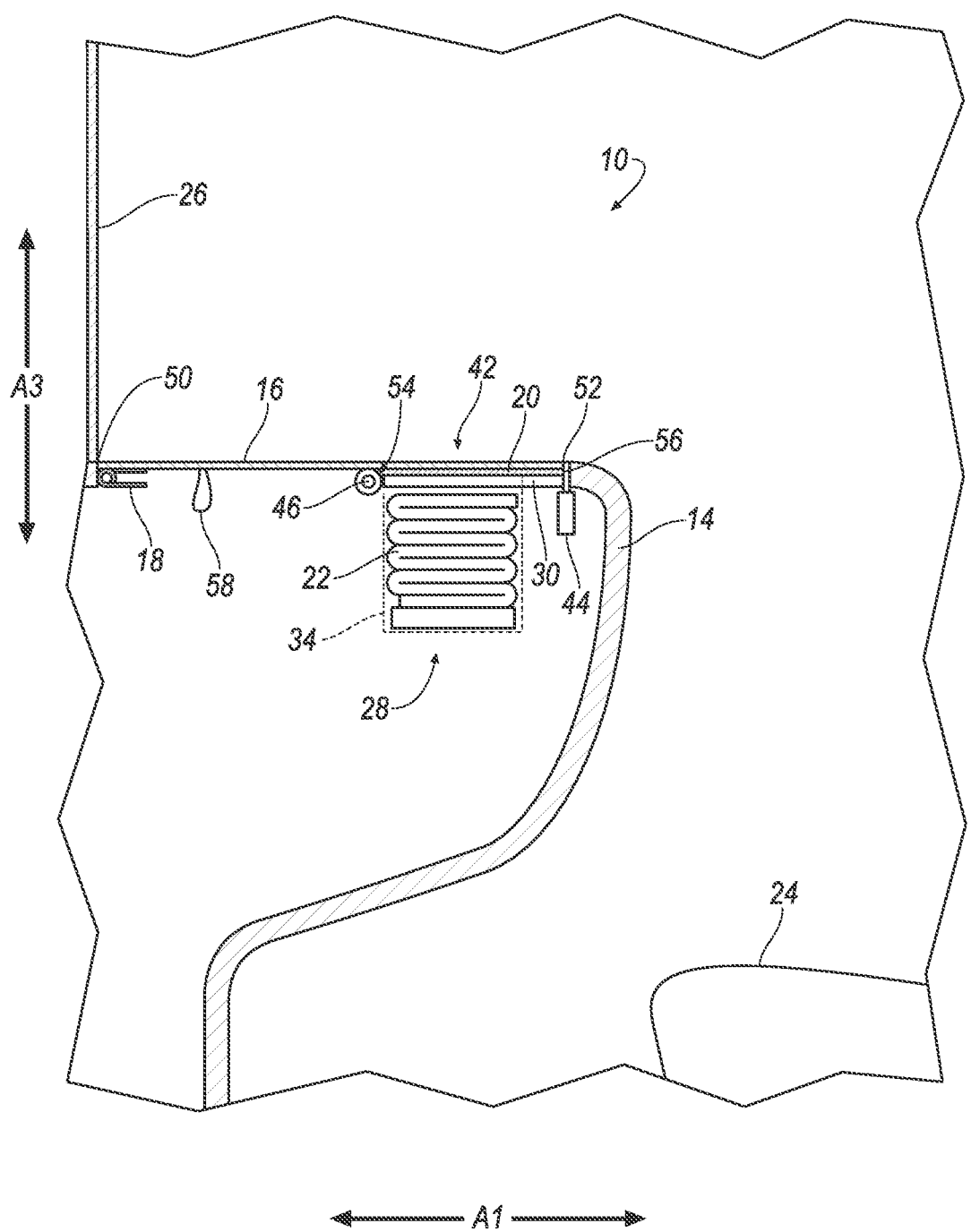
FIG. 6 is a cross-sectional view of the assembly with the panel in the undeployed position.
Figure 7:
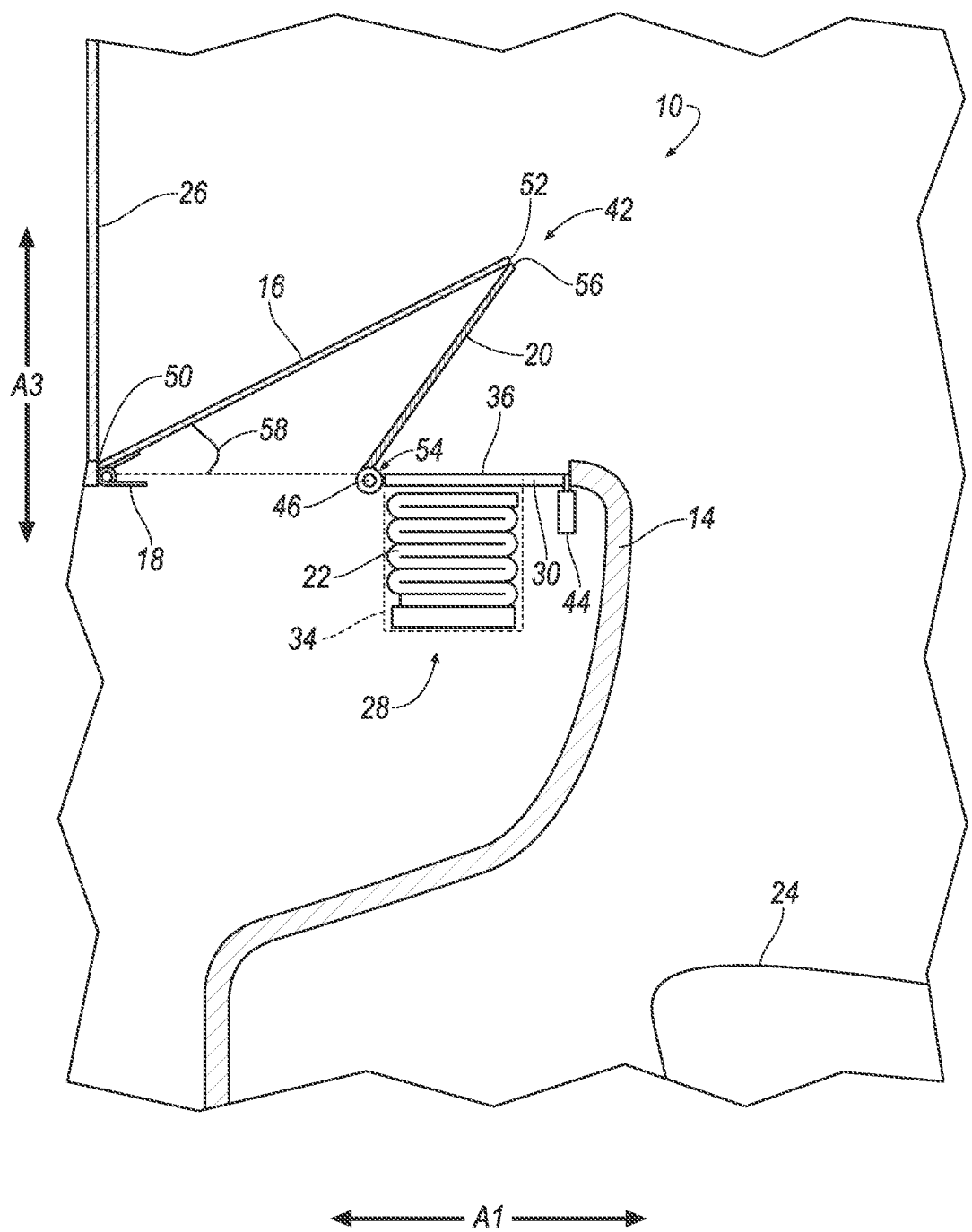
FIG. 7 is a cross-sectional view of the assembly with the panel moving to the deployed position.

The airbag 22 is mounted to the interior component 14, e.g., via the housing 34. For example, the housing 34 may be mounted to the shelf 30. In such an example, the airbag 22 is open upwardly, e.g., the shelf 30 has a cavity 36 through which the airbag 22 extends in the inflated position. The housing 34 houses the airbag 22 in the uninflated position, as shown in FIGS. 6 and 7. The housing 34 supports the airbag 22 while being inflated and when the airbag 22 is in the inflated position, as shown in FIG. 8. The airbag 22 may be rolled and/or folded to fit within the housing 34 in the uninflated position. The housing 34 may be of any suitable material, e.g., a rigid polymer, a metal, a composite, or a combination of rigid materials. The housing 34 may be supported by the interior component 14.

The airbag 22 is positioned to abut the sheet 20 when the airbag 22 is inflated to the inflated position and the sheet 20 is in the deployed position. In other words, the airbag 22, the panel 16, and the sheet 20 are positioned on the interior component 14 such that, when the airbag 22 is inflated to the inflated position and the sheet 20 is moved to the deployed position, the airbag 22 abuts the sheet 20. Specifically, the airbag 22, the panel 16, and the sheet 20 may be positioned on the interior component 14 such that the airbag 22 abuts the sheet 20 even in the absence of the force of an occupant pushing the airbag 22 toward the sheet 20.

The airbag 22 may be a woven polymer or any other material. As one example, the airbag 22 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 32 is in fluid communication with the airbag 22, e.g., via tubing or other structure to transfer inflation medium from the inflator 32 to the airbag 22. Upon receiving an instruction, such as an electrical pulse, from, e.g., a computer 38, the inflator 32 may inflate the airbag 22 with an inflatable medium, such as a gas, to the inflated position. The inflator 32 may be, for example, a pyrotechnic inflator that uses a chemical reaction to drive inflation medium to the airbag 22. The inflator 32 may be of any suitable type, for example, a cold-gas inflator. The inflator 32 may be supported by the housing 34 or at any other suitable vehicle location.

In the event of an impact, a plurality of impact sensors 40 may detect the impact and transmit a signal through a communications network to a computer 38. The computer 38 may transmit a signal through the communications network to the inflator 32. The inflator 32 may discharge and inflate the airbag 22 to the inflated position.

The assembly 10 includes a deployable assembly 42. The deployable assembly 42 includes the panel 16 and the sheet 20. In some embodiments of the assembly 10, such as the example shown in the figures, the deployable assembly 42 may include the actuator 18 between the panel 16 and the interior component 14, a release 44 to release the panel 16 relative to the interior component 14, and a spool 46 that releases sheet 20. The deployable assembly 42 is supported by the interior component 14, e.g., the panel 16, the spool 46, the actuator 18, and the release 44 may each be supported by the interior component 14.

Figure 4:
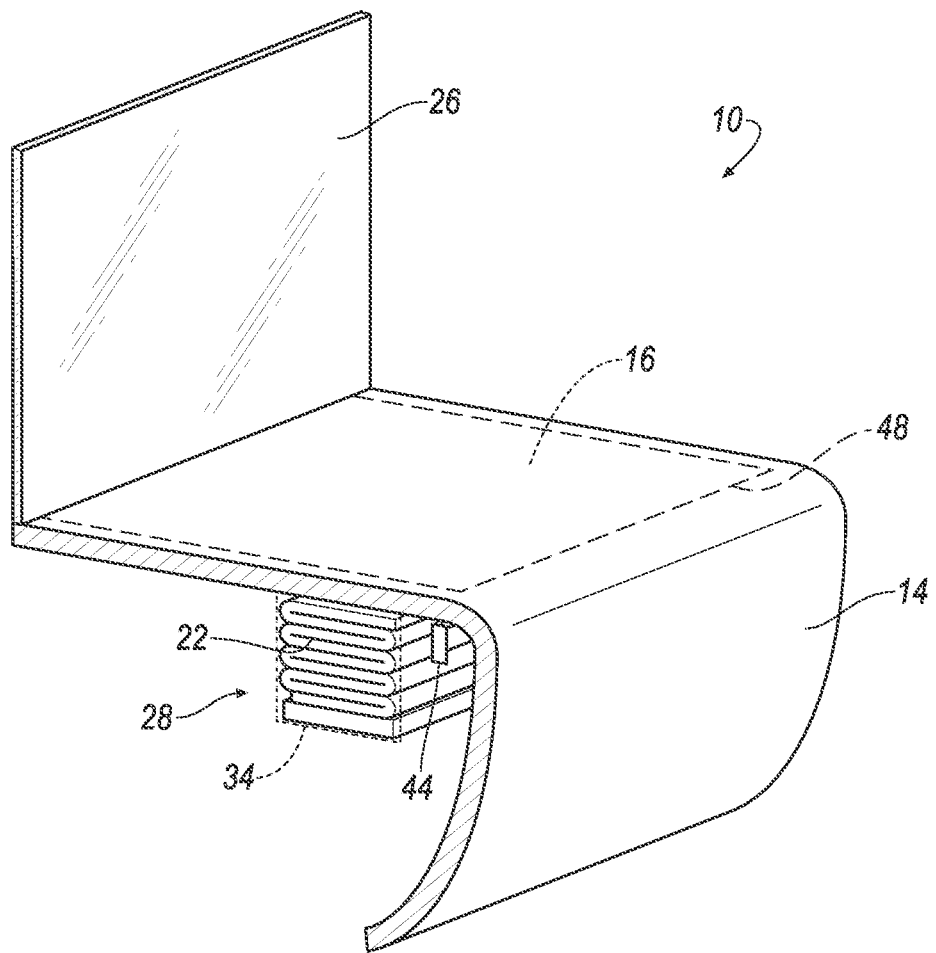
FIG. 4 is a cut-away view of a portion of the assembly with the panel in the undeployed position and the airbag uninflated.

As shown in FIGS. 4 and 5, the panel 16 is connected to the interior component 14 in the undeployed position. Specifically, the panel 16 may be connected to the interior component 14 around the periphery of the panel 16. As an example, the panel 16 may be connected to the exterior panel of the interior component 14. In such an example, the panel 16 and the exterior panel may have a common appearance, e.g., common color, texture, etc., and may both be a class-A surface. Tear seams 48 may be between at least a portion of the panel 16 and the exterior panel to allow the panel 16 to deploy from the an undeployed position (FIG. 4) to a deployed position (FIG. 5).

The panel 16 may be connected to the interior component 14 adjacent the windshield 26 and extend to the shelf 30. Specifically, the panel 16 may overlap the shelf 30 and the airbag 22. The panel 16 extends from a first end 50 to a second end 52 spaced from the first end 50. As in the example shown in the figures, the first end 50 may be connected to the interior component 14 adjacent the windshield 26 and the second end 52 of the panel 16 may overlap the shelf 30.

The panel 16 may be rotatably connected to the interior component 14. In the example shown in the Figures, the first end 50 may be rotatably connected to the interior component 14, e.g., at a hinge. The hinge may be of any suitable type, e.g., a living hinge between the first end 50 and the exterior panel of the interior component 14, a butt hinge between the panel 16 and the interior component 14, etc.

The panel 16 is releasable from the undeployed position to a deployed position. As an example, the release 44 may be activated allowing the actuator 18 to move the panel 16 from the undeployed position to the deployed position. As another example, the actuator 18 may include the release 44, i.e., the actuator 18 and the release 44 may be one, single component that both releases the panel 16 from the interior component 14 and forces the panel 16 to the deployed position, e.g., a pyrotechnic device that detonates to both release the panel 16 from the interior component 14 and force the panel 16 to the deployed position. When the panel 16 moves from the undeployed position to the deployed position, the panel 16 may be rotatable away from the interior component 14 and toward the windshield 26.

the release 44 is fixed relative to the interior component 14, e.g. is mounted to the interior component 14, and is releasably engaged with the panel 16. When activated, the release 44 releases the panel 16 relative to the interior component 14 to allow the panel 16 to move to the deployed position. the release 44 may be spaced from the hinge and/or from the actuator 18. the release 44 may include a pin that releasably engages the panel 16. the release 44 may be, for example, a pyrotechnic release. In such an example, the pyrotechnic release includes a pyrotechnic charge that detonates upon actuation, e.g., in response to an electrical pulse. Upon detonation, the pin releases the panel 16 from the interior component 14. Other examples of the actuator 18 may include a linear actuator, a solenoid actuator, a pneumatic actuator, a piezoelectric actuator, and/or another suitable actuator that releases the panel 16 to be movable from the undeployed position to the extended position.

The actuator 18 is engaged with the panel 16 to force the panel 16 to the deployed position when the panel 16 is released by the release 44. The actuator 18 is positioned between the interior component 14, e.g., is engaged with the interior component 14 and the panel 16, and biases the panel 16 relative to the interior component 14 toward the deployed position. As an example, the actuator 18 may be at the first end 50 of the panel 16. The actuator 18 may be a spring loaded against the interior component 14 and the panel 16 when the panel 16 is in the undeployed position. For example, the actuator 18 may be a torsion spring.

When the release 44 releases the panel 16 relative to the interior component 14, the actuator 18 forces the panel 16 to the deployed position. For example, in examples in which the panel 16 is connected to the interior component 14 at tear seams 48, the actuator 18 overcomes the tear seams 48 to break the tear seams 48 and force the panel 16 to the deployed position.

The sheet 20 has a first end 54 anchored to the interior component 14 and a second end 56 anchored to the second end 52 of the panel 16. The second end 56 of the sheet 20 may be connected to the second end 56 of the panel 16.

As shown in FIGS. 6-8, the spool 46 is supported by the interior component 14. As an example, the spool 46 may be supported by the shelf 30 of the interior component 14. The first end 54 of the sheet 20 may be connected to the spool 46 and the sheet 20 may be wound about the spool 46 when the panel 16 is in the undeployed position. In other words, when the panel 16 is in the undeployed position, the sheet 20 may be wound around the spool 46 with the sheet 20 extending from the spool 46 to the second end 52 of the panel 16.

The spool 46 may be spring-loaded to maintain the sheet 20 wound about the spool 46 when the panel 16 is in the undeployed position and to allow the sheet 20 to unwind from the spool 46 when the panel 16 moves from the undeployed position to the deployed position. In other words, the spool 46 may include a rod about which the sheet 20 is wound and a spring that biases the rod to wind the sheet 20.

When the panel 16 is in the undeployed position, the sheet 20 may extend to the second end 52 of the panel 16 between the panel 16 and the interior component 14, e.g., between the panel 16 and the shelf 30 of the interior component 14. As the panel 16 rotates from the undeployed position to the deployed position, the panel 16 pulls the sheet 20 upwardly. During this movement, the spool 46 rotates as the sheet 20 unwinds the spool 46. The sheet 20 may be in a generally vertical position when the panel 16 reaches the deployed position for the sheet 20 to act as a reaction surface for the airbag 22 when the airbag 22 is in the inflated position.

As set forth above, the airbag 22 is inflatable to the inflated position adjacent the sheet 20. The airbag 22 may abut the sheet 20 when the airbag 22 is in the inflated position and the sheet 20 is in the generally vertical position, i.e., the airbag 22 may use the sheet 20 as a reaction surface when the airbag 22 is in the inflated position.

The sheet 20 may be flexible relative to the panel 16. In other words, the sheet 20 deforms more easily than the panel 16 when impacted. The sheet 20, for example, may be plastic, fabric, etc. The sheet 20 may be of a material similar or the same as the material of the airbag 22. The flexibility of the sheet 20 allows the sheet 20 to absorb energy from the impact of a passenger on the airbag 22 in the event of an impact to the vehicle 12.

With reference to FIGS. 5, 7, and 8, the assembly 10 may include a tether 58 extending from the interior component 14 to the panel 16. The tether 58 is designed to, i.e., positioned and having a length, restrict movement of the panel 16 beyond the deployed position. For example, the tether 58 restricts the rotation of the panel 16 such that when the tether 58 is fully extended, the sheet 20 is in the generally vertical position.

Figure 9:
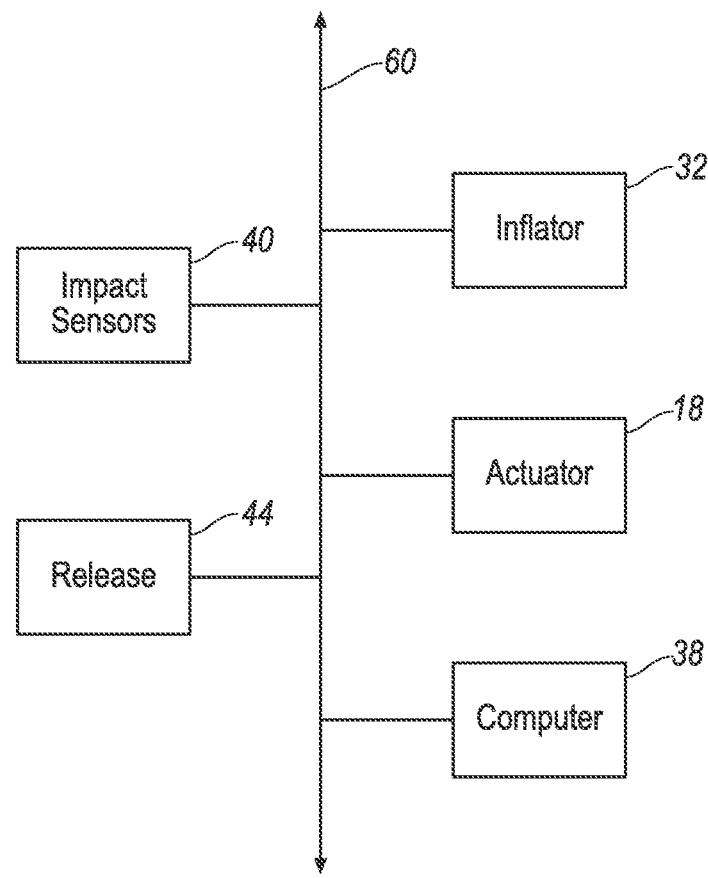
FIG. 9 is a block diagram of a communication network of the vehicle.

As shown in FIG. 9, a communication network 60 includes hardware, such as a communication bus, for facilitating communication among vehicle components. The communication network 60 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 38 may be a microprocessor-based computer implemented via circuits, chips, or other electronic components. For example, the computer 38 may include a processor, memory, etc. The memory of the computer 38 may include memory for storing instructions executable by the processor as well as for electronically storing data and/or databases.

The computer 38, implemented via circuits, chips, or other electronic components, is included in the vehicle control system for carrying out various operations, including as described herein. The computer 38 is a computing device that generally includes a processor and a memory, the memory including one or more forms of computer-readable media and storing instructions executable by the processor for performing various operations, including as disclosed herein. In other words, the memory includes instructions executable by the processor. The memory of the computer 38 generally stores remote data received via various communications mechanisms; e.g., the computer 38 is generally configured for communications on a controller area network (CAN) bus or the like, and/or for using other wired or wireless protocols, e.g., Bluetooth, etc. The computer 38 may also have a connection to an onboard diagnostics connector (OBD-II). Via a communication network 60 using Ethernet, WiFi, the CAN bus, Local Interconnect Network (LIN), and/or other wired or wireless mechanisms, the computer 38 may transmit messages to various devices in the vehicle 12 and/or receive messages from the various devices, e.g., controllers, actuators, sensors, etc. For example, the computer 38 may receive data from vehicle sensors.

Figure 10:
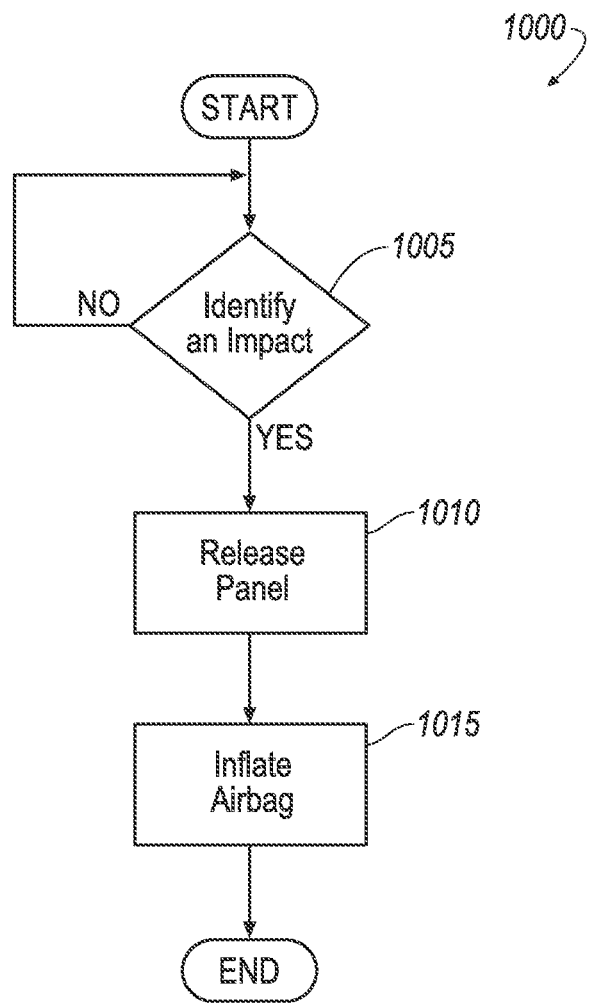
FIG. 10 is a flowchart of a method of operating the assembly.

FIG. 10 shows a method 1000 of operating the assembly 10. The computer 38 is programmed to, i.e., includes instructions to, perform the method 800.

With reference to block 1005, the computer 38 may include instructions to identify an impact to the vehicle 12. The plurality of impact sensors 40 may identify that an impact has occurred. The computer 38 may be programmed to determine whether the impact is of the type that triggers inflation of the airbag 22.

With reference to block 1010, in response to identification of the impact to the vehicle 12, the computer 38 may include instructions to release the panel 16 from the interior component 14. The panel 16 may be released from the undeployed position to the deployed position. Specifically, in the example shown in the Figures, the computer 38 instructs the release 44 to release the panel 16. In such an example, the actuator 18, e.g., the spring, moves the panel 16 to the deployed position.

With reference to block 1015, the computer 38 may include instructions to subsequently inflate the airbag 22 to the inflated position after the release 44 of the panel 16. This provides time for the panel 16 to reach the deployed position before the airbag 22 deploys. As an example, the computer 38 may delay inflation of the airbag 22 for 10 ms after release of the panel 16. The computer 38 instructs inflation of the airbag 22 by providing instruction to activate the inflator 32.

Use of "in response to" herein indicates a causal relationship, not merely a temporal relationship. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
an interior component;
a panel rotatably connected to the interior component;
an actuator designed to rotate the panel relative to the interior component;
a sheet extending from the interior component to the panel, the sheet being flexible relative to the panel; and
an airbag supported by the interior component and inflatable to an inflated position adjacent the sheet.

2. The assembly as set forth in claim 1, wherein the panel has a first end rotatably connected to the interior component and a second end spaced from the first end, the sheet extending to the second end.

3. The assembly as set forth in claim 2, wherein the actuator is a spring biasing the panel about the first end.

4. The assembly of claim 1, further comprising a tether extending from the interior component to the panel.

5. The assembly of claim 1, further comprising a spool supported by the interior component, the sheet being wound around the spool.

6. The assembly of claim 5, wherein the spool is spring-loaded.

7. The assembly of claim 1, further comprising a computer including a processor and a memory storing instructions executable by the processor to release the panel from the interior component and subsequently inflate the airbag.

8. The assembly of claim 1, further comprising a windshield, the panel being rotatable away from the interior component and toward the windshield.

9. The assembly of claim 1, wherein the airbag abuts the sheet when the airbag is in the inflated position.

10. The assembly of claim 1, wherein the actuator is a spring.

11. The assembly of claim 1, wherein the actuator is a torsion spring.

12. The assembly of claim 1, wherein the interior component includes a shelf supporting the airbag and the panel overlaps the shelf.

13. The assembly of claim 12, wherein the panel overlaps the airbag.

14. The assembly of claim 12, wherein the sheet is sandwiched between the panel and the shelf.

15. The assembly of claim 12, wherein the panel has a first end rotatably connected to the interior component and a second end spaced from the first end, the second end overlapping the shelf.

16. The assembly of claim 15, wherein the sheet has a first end anchored to the interior component and a second end connected to the second end of the panel.

17. The assembly of claim 16, further comprising a spool, the first end of the sheet being connected to the spool.

18. The assembly of claim 1, wherein the interior component is an instrument panel.

19. An assembly, comprising:
an interior component;
a panel rotatably connected to the interior component;
an actuator designed to rotate the panel relative to the interior component;
a sheet extending from the interior component to the panel;
an airbag supported by the interior component and inflatable to an inflated position adjacent the sheet; and
a spool supported by the interior component, the sheet being wound around the spool.

20. An assembly, comprising:
an interior component;
a panel rotatably connected to the interior component;
an actuator designed to rotate the panel relative to the interior component;
a sheet extending from the interior component to the panel; and
an airbag supported by the interior component and inflatable to an inflated position adjacent the sheet;
the interior component including a shelf supporting the airbag and the panel overlaps the shelf.

* * * * *